(12) United States Patent
Muthukumar et al.

(10) Patent No.: US 6,571,385 B1
(45) Date of Patent: May 27, 2003

(54) EARLY EXIT TRANSFORMATIONS FOR SOFTWARE PIPELINING

(75) Inventors: Kalyan Muthukumar, Cupertino, CA (US); Dong-Yuan Chen, Fremont, CA (US); Youfeng Wu, Palo Alto, CA (US); Daniel M. Lavery, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/273,947

(22) Filed: Mar. 22, 1999

(51) Int. Cl.[7] .............................. G06F 9/44; G06F 9/32
(52) U.S. Cl. ..................... 717/150; 712/219; 712/239
(58) Field of Search .................... 717/9, 150; 712/244, 712/239, 209, 215, 219; 711/137; 710/112

(56) References Cited

U.S. PATENT DOCUMENTS

| | | | | |
|---|---|---|---|---|
| 4,755,966 A | * | 7/1988 | Lee et al. ..................... | 712/239 |
| 5,471,593 A | * | 11/1995 | Branigin ..................... | 712/235 |
| 5,787,013 A | * | 7/1998 | Yui ............................. | 364/490 |
| 5,898,865 A | * | 4/1999 | Mahalingaiah .............. | 712/239 |
| 5,901,308 A | * | 5/1999 | Cohn et al. .................. | 712/244 |
| 6,141,732 A | * | 10/2000 | Adams ........................ | 711/137 |
| 6,178,499 B1 | * | 1/2001 | Stotzer et al. .............. | 712/241 |
| 6,230,317 B1 | * | 5/2001 | Wu ............................. | 717/9 |
| 6,286,135 B1 | * | 9/2001 | Santhanam ................. | 717/146 |

OTHER PUBLICATIONS

Advanced Compiler Design & Implementation, Steven S. Muchnick, Chapters 17–20, published Aug. 19, 1997.*
Compilers Principles, Techniques and Tools, Aho et al, Chapters 9–10, published Sep. 12, 1985.*
Tirumalai, P., et al., "Parallelization of Loops with Exits on Pipelined Architectures", *Supercomputing Conference, Sponsored by IEEE Computer Society*, 200–212, (Dec. 1990).

* cited by examiner

*Primary Examiner*—Todd Ingberg
(74) *Attorney, Agent, or Firm*—Schwegman, Lundberg, Woessner & Kluth, P.A.

(57) ABSTRACT

The invention is directed to the transformation of software loops having early exit conditions, thereby allowing the loops to be more effectively converted to a single basic block for software pipelining. The invention assigns a predicate register for each early exit condition of the software loop. The predicate registers are set when the corresponding early exit condition is satisfied. In this manner, when the loop terminates the predicate registers can be examined to indicate which early exit conditions were satisfied. The invention produces loops having a lower recurrence II and resource II than conventional techniques.

18 Claims, 7 Drawing Sheets

EARLY EXIT TRANSFORMATIONS FOR SOFTWARE PIPELINING

TECHNICAL FIELD

This invention relates generally to the field of computing environments and, more particularly, to a method of transforming software loops having early exits.

BACKGROUND INFORMATION

In order to accelerate the processing of data, many high-performance computing systems overlap the execution of loop iterations using a technique called software pipelining. This improves the utilization of available hardware resources by increasing instruction-level parallelism. The task of software pipelining is simplified when the loop consists of a single basic block that has a single loop exit. Thus, in order to generate code that can be software pipelined, compilers strive to transform loops that have multiple exits (a normal loop exit and one or more early exits) into loops having a single exit. Current techniques, however, often produce transformed loops that are inefficient and have high complexity. For these reasons, and for other reasons stated below which will become apparent to those skilled in the art upon reading and understanding the present specification, there is a need for the present invention.

SUMMARY OF THE INVENTION

As explained in detail below, the invention is directed to the transformation of software loops having early exit conditions. In one embodiment the invention transforms the software loop by assigning a predicate register for each early exit condition of the software loop such that the predicate registers are set within the software loop when the corresponding early exit condition is satisfied. The predicate registers are examined after termination of the transformed loop in order to determine which early exit condition prevailed.

DETAILED DESCRIPTION

In the following detailed description, references are made to the accompanying drawings that illustrate specific embodiments in which the invention may be practiced. The following detailed description is not to be taken in a limiting sense and the scope of the invention is defined by the claims.

Figure 1:
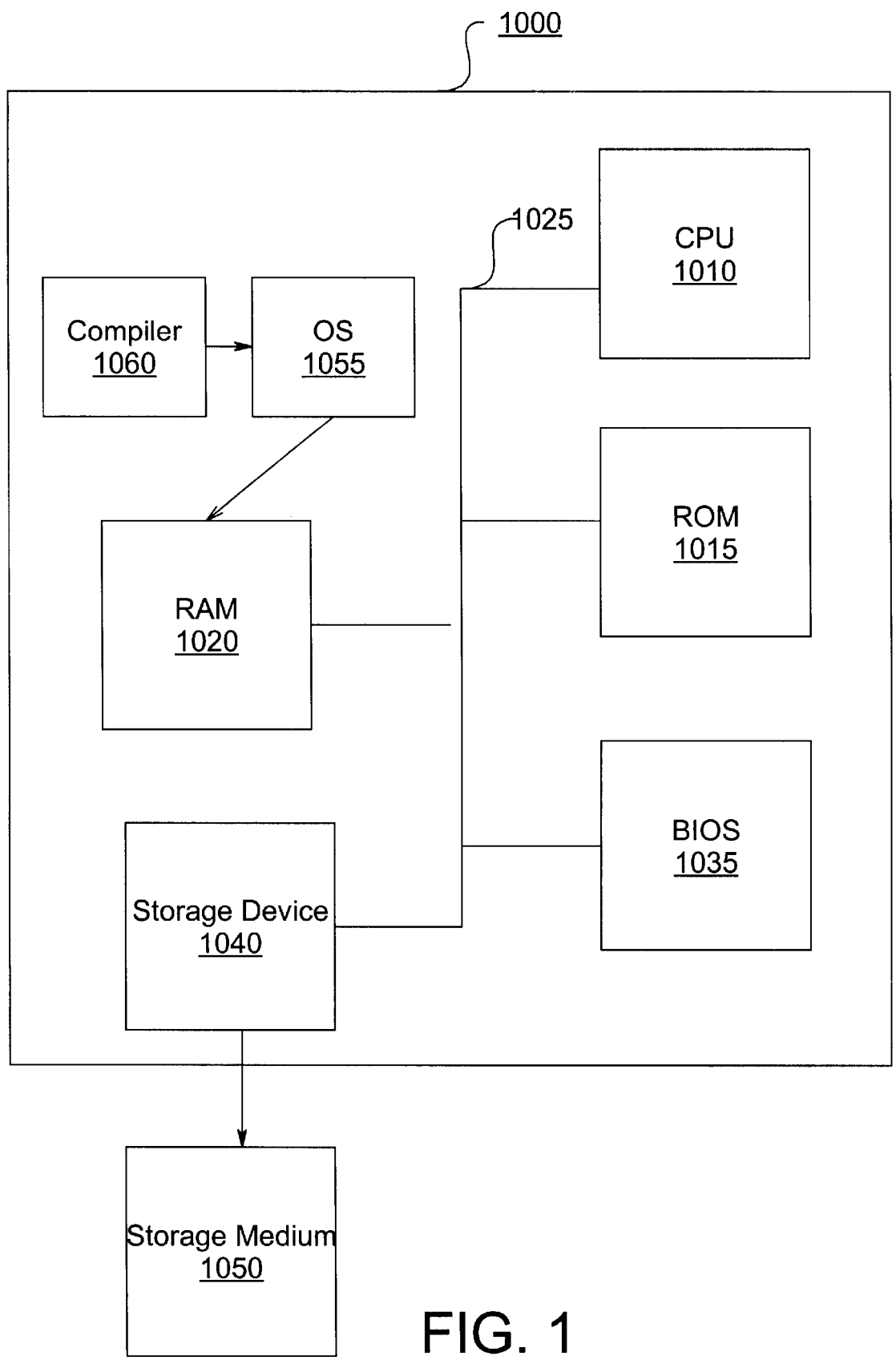
FIG. 1 is a block diagram showing functional components of the computer in conjunction with which embodiments of the invention may be practiced.

FIG. 1 illustrates a computing system 1000 that represents any general purpose computing device having various internal computing components including CPU 1010, read-only memory (ROM) 1015, random-access memory (RAM) 1020, and one or more busses 1025 that operatively couple the components. There may be only one processing unit, such that computing system 1000 comprises a single central-processing unit (CPU), or a plurality of processing units, commonly referred to as a parallel processing environment. Basic input/output system (BIOS) 1035 contains all code required to control basic devices including a keyboard, a display screen, disk drives, serial communications, etc.

Computing system 1000 further includes storage device 1040 for accessing computer-readable medium 1050 that represents any storage medium, such as a disk-shaped data storage medium, for holding digital information. Computer-readable medium 1050 may be an internal hard disk or a removable data storage device such as a floppy diskette, a magneto-optical storage device, a SuperDisk™ diskette, a Zip™ disk, a Jaz™ disk, a tape cartridge etc. Storage device 1040 represents any device suitable for servicing access requests such as an internal hard drive, a floppy drive, a magneto-optical drive a CD ROM drive, a SuperDisk™ drive, a removable-cartridge hard drive such as a Zip™ drive, or even a tape drive. Operating system 1055 provides an interface by which one or more software applications operate storage device 1040 in order to access the digital information held by computer-readable medium 1050. For example, compiler 1060 interfaces with operating system 1055 to generate machine instructions executable by CPU 1010. According to the invention, compiler 1060 transforms software loops having early exit conditions.

Figure 2:
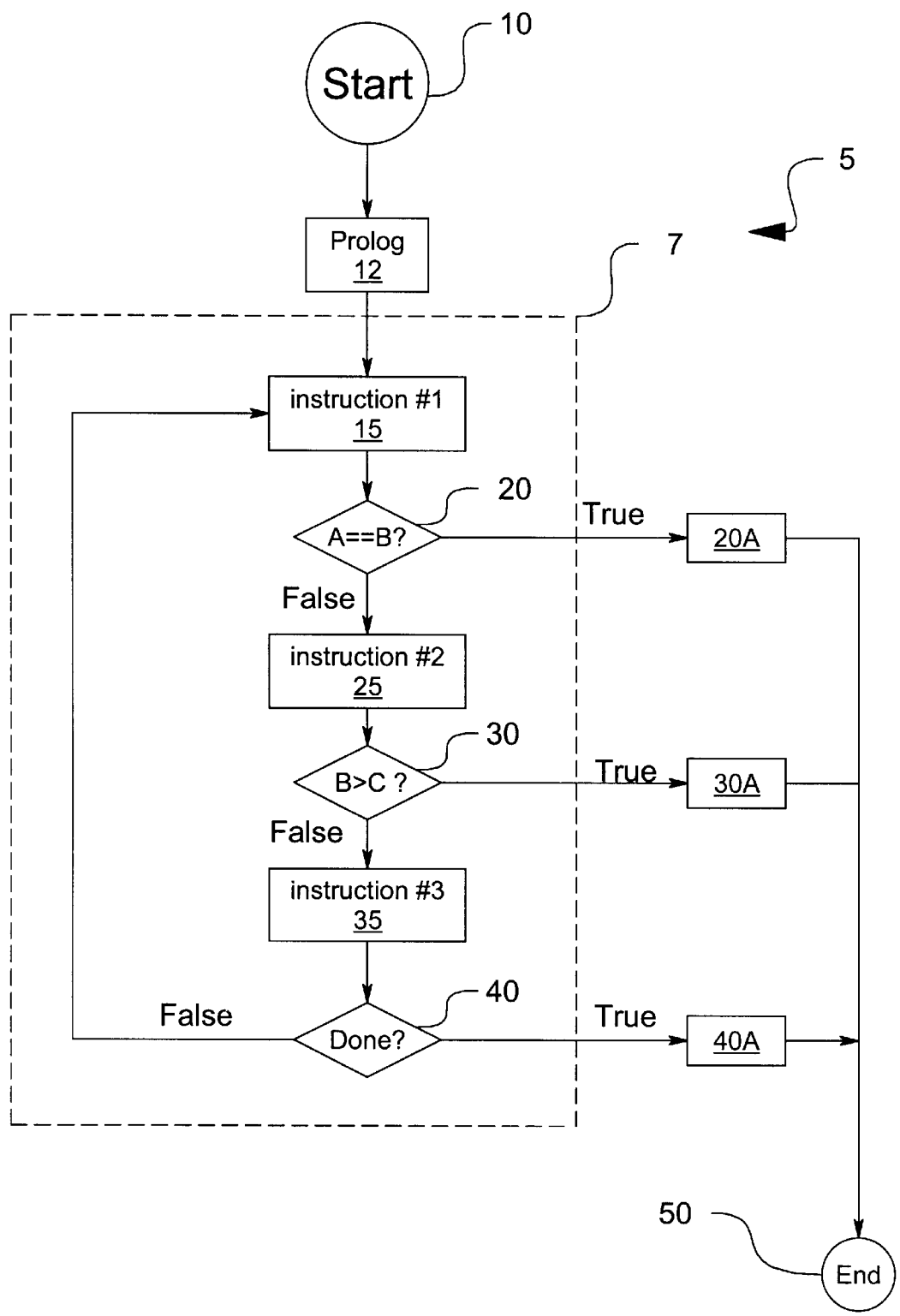
FIG. 2 is a flowchart illustrating a general software program that has a loop with two early exits.

FIG. 2 illustrates a general software program 5 having loop 7 that contains two early exits represented by blocks 20 and 30. In FIG. 2, software program 5 starts in block 10 and proceeds to block 12 which is the prolog (or "preheader") for loop 7 and represents instructions that are executed prior to entering loop 7. For example software program 5 may initialize a loop counter within block 12.

Next, software program 5 enters loop 7 by proceeding to block 15. Block 15 represents any instruction, or set of instructions, that is performed for each iteration of loop 7 such as incrementing the loop counter, etc. Block 20 of software program 5 represents the first early exit condition. When the condition of block 20 is true, software program 5 exits loop 7, executes block 20A and terminates with block 50.

When the early exit condition 20 is false, software program 5 proceeds to block 25 that represents one or more instructions. Next, software program 5 executes the second early exit condition in block 30. When the second early exit condition is true, software program 5, executes block 30A and terminates with block 50. When the second early exit condition is false, software program 5 executes block 35 and proceeds to block 40 which is referred to herein as the loop branch for loop 7. In block 40 software program 5 determines whether to exit loop 7. If the loop exit condition is false, loop 7 is repeated. If loop exit is true then block 40A is executed and software program 5 terminates with block 50.

As explained in detail below, the invention exploits certain characteristics of predicated instruction sets in order to improve loop transformation. In such an instruction set, predicated instructions are executed only if a certain condition is true, i.e., if the qualifying predicate register is set to one. For example, consider the following branch.instruction:

"(P1) branch 10". Here, P1 is the predicate register, and the branch instruction is only executed if P1 is true. The following pseudo code illustrates how loop 7 of FIG. 2 could be implemented with a predicated instruction set using predicate registers P1 through P6:

| | |
|---|---|
| A1 | instruction #1 |
| A2 | cmp, p1, p2 = (A == B) |
| A3 | (p1) branch to block 20A of FIG. 2 |
| A4 | instruction #2 |
| A5 | cmp, p3, p4 = (B > C) |
| A6 | (p3) branch to block 30A of FIG. 2 |
| A7 | instruction #3 |
| A8 | cmp p5, p6 = (DONE?) |
| A9 | (p6) branch to line A1 |

Figure 3:
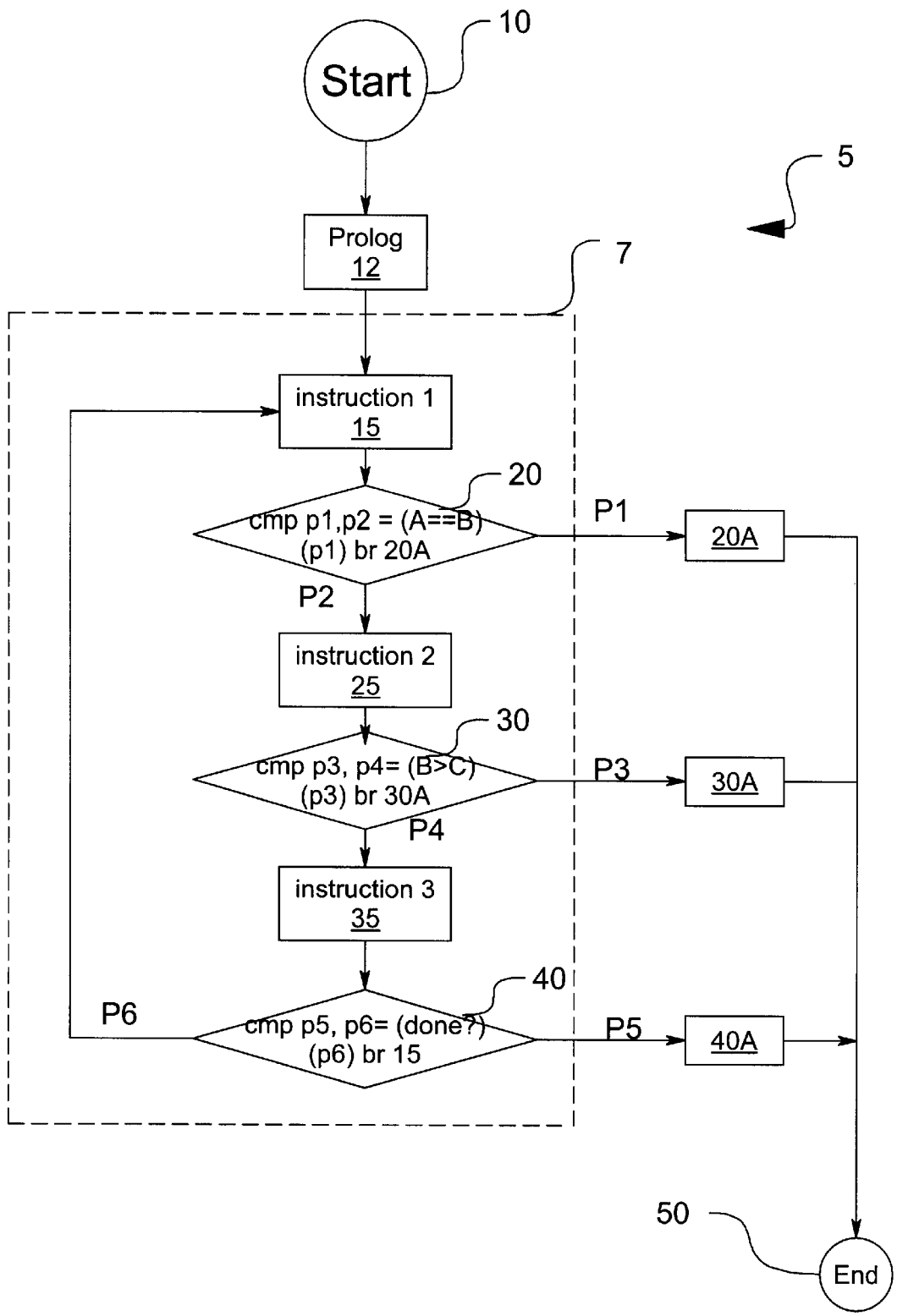
FIG. 3 is a flowchart illustrating the software loop of FIG. 2 using predicated instructions.

In the above pseudo code, line A1 executes instruction #1. Lines A2 and A3 implement the first early exit condition of FIG. 2, i.e., block 20. Line A2 compares A and B and sets P1 to one and P2 to zero when A equals B and sets P2 to one and P1 to zero when A is not equal to B. Line A3 is a predicated instruction, i.e., the branch statement to block 20A is only executed if predicate register P1 is set to one. Otherwise, control flows to line A4, which executes instruction #2. Lines A5 and A6 operate similarly to implement the second early exit condition of block 30. Line A8 tests whether the loop is finished and sets P5 and P6 accordingly. Line A9 branches to line A1 (Block 15 of FIG. 2) if P6 is set to one, i.e., loop 7 is not finished. FIG. 3 is a flowchart illustrating software program 5 of FIG. 2 as implemented using predicated instructions as described above.

One conventional approach for transforming loops having multiple exits to a loop with a single exit is described by Tirumalai, et al. in "Parallelization of Loops With Exits on Pipelined Architectures", Supercomputing Conference, Dec. 1990, pages 200–212. According to this approach, a register is used to record the prevailing exit condition. After the loop terminates, the register is examined in order to determine which exit condition was satisfied. Based on which exit condition exists, the software program takes any necessary corrective action.

After this transformation, the loop has a single exit but still consists of multiple basic blocks. It can be transformed into a loop with a single basic block using a known technique such as "if-conversion". Those skilled in the art will know that if-conversion on a set of basic blocks removes branches by appropriately predicating instructions in such blocks.

FIG; 4 is a flowchart 200 illustrating in more detail the Tirumalai method for transforming loops having early exit conditions. The transformation method starts in step 202 and proceeds to step 205. In step 205, the method introduces code to initialize a register (R) to a predetermined value such as zero. This register is used to record the prevailing exit condition for loop 7. Next, as illustrated in step 210, the method creates a new loop branch for loop 7. This new loop branch determines whether an exit condition has been met by checking whether R equals 0. If no condition has been met, the new loop branch jumps to the top of loop 7. In step 215, the transformation method creates a new target block for each early exit and for the original loop branch. These target blocks write the register (R) in order to record which exit condition has been met. In step 220 the method modifies the original loop branch to jump to one of the new target blocks instead of the top of the loop. In step 225 the method creates a series of branches that are executed after the loop terminates. These branches examine the register and jump to the original destinations of the early exits. Finally, in step 227 the compiler converts the transformed loop into a loop having a single basic block using a known technique such as "if-conversion".

Figure 4:
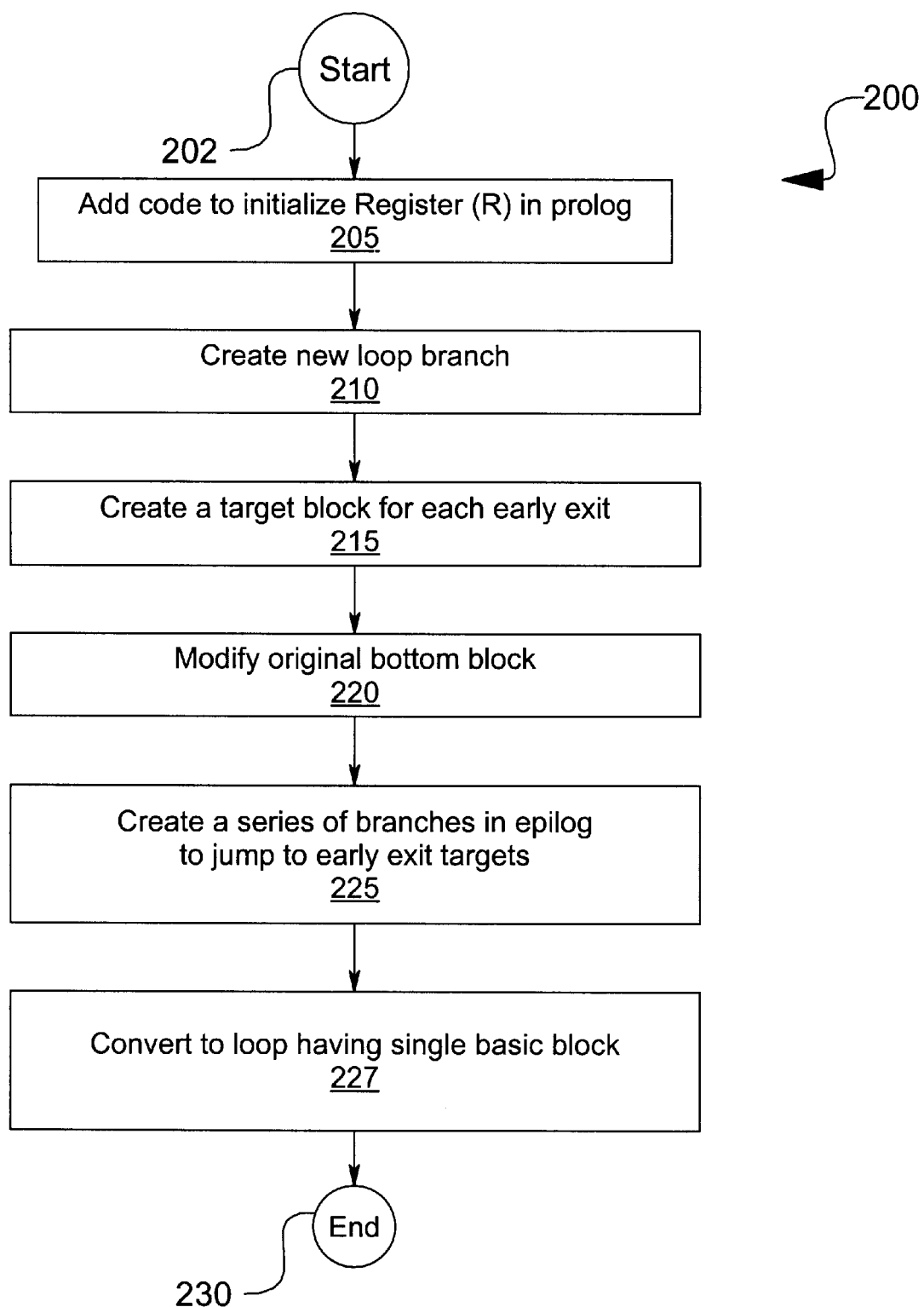
FIG. 4 is a flowchart illustrating a conventional method for transforming loops having early exit conditions.
Figure 5:
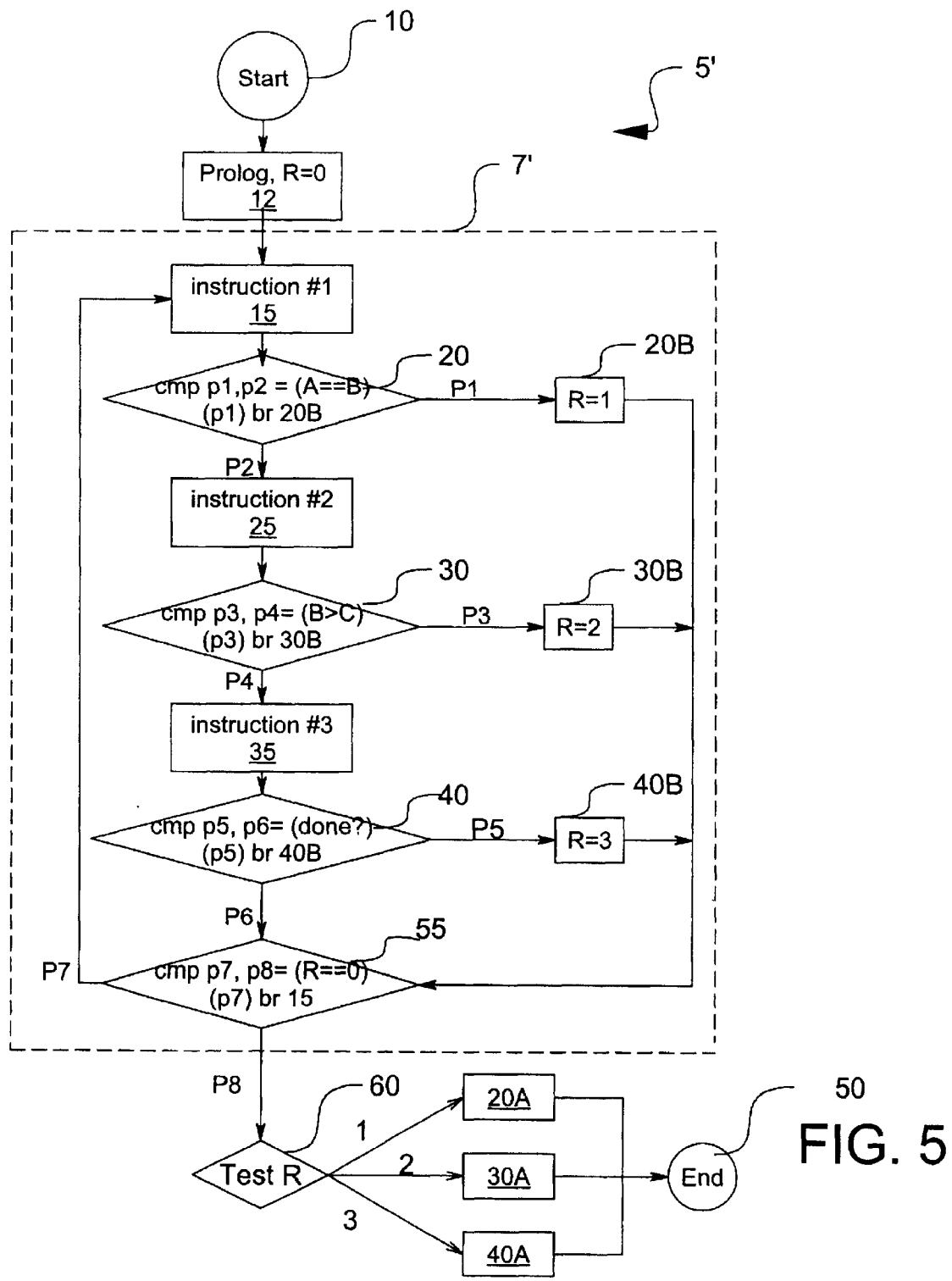
FIG. 5 is a flowchart illustrating the software program of FIG. 3 after transformation according to the method of FIG. 4.

FIG. 5 illustrates the Tirumalai transformation method as applied to software program 5 of FIG. 2, thereby resulting in software program 5' having transformed loop 7'. According to step 205 of FIG. 4, block 12 has been modified such that the register (R) is initialized to zero. According to step 210 of the method, new block 55 is created which sets predicate registers P7 and P8 based on a comparison between R and zero. Thus, if R is zero then P7 is set and software program 5' branches to block 15. According to step 215, the method creates a series of new target blocks 20B, 30B and 40B that modify R in order to record the prevailing exit condition of loop 7'. Next, the method modifies the original loop branch, block 40 of FIG. 3, such that the branch jumps to new target block 40B when the loop is done and otherwise falls through to block 55. Finally, according to step 225 of FIG. 4, the method adds block 60 that examines the register and jumps to original exit blocks 20A, 30A or 40A depending on the exit condition.

The following pseudocode is one example of how a compiler could convert the transformed loop 7' of FIG. 5 into a single basic block:

| | |
|---|---|
| B1 | instruction #1 |
| B2 | cmp p1, p2 = (A == B) |
| B3 | (p1) R = 1 |
| B4 | (p2) instruction #2 |
| B5 | (p2) cmp.unc p3, p4 = (B > C) |
| B6 | (p3) R = 2 |
| B7 | (p4) instruction #3 |
| B8 | (p4) cmp.unc p5, p6 = (done?) |
| B9 | (p5) R = 3 |
| B10 | cmp p7, p8 = (R == 0) |
| B11 | (p7) branch to line B1 |

As illustrated in the above pseudocode, for a software loop having N exits, the Tirumalai approach requires N new instructions for setting the value of the register R. These additions, as well as the addition of an extra compare (instruction B10), lead to an inefficient conversion of loop 7' to a single exit loop.

A common metric that indicates the efficiency of a software-pipelined loop is known as the initiation interval (II), which is the interval between the start of two successive iterations.of a software-pipelined loop. II is bounded from below by the maximum of ResourceII and RecurrenceII. ResourceII is determined by the number of instructions in the loop. RecurrenceII is determined by the circular chain of dependences in the loop.

The resourceII of the loop in the above pseudocode could potentially be increased by the addition of the four new instructions B3, B6, B9, and B10. This loop has a minimum recurrence II of 5 cycles as represented by the following circular chain of dependences between instructions B10→B2→B5→B8→B9→B10, assuming that each instruction requires one cycle to execute. Those skilled in the art will realize that B10→B2 is a control dependence edge while the others are data dependence edges. In other words, the minimum cycles that are necessary between the start of successive iterations is determined by the dependence chain through compare instructions B2, B5, and B8, setting the register R in instruction B9 and executing the comparison in instruction B10.

Figure 6:
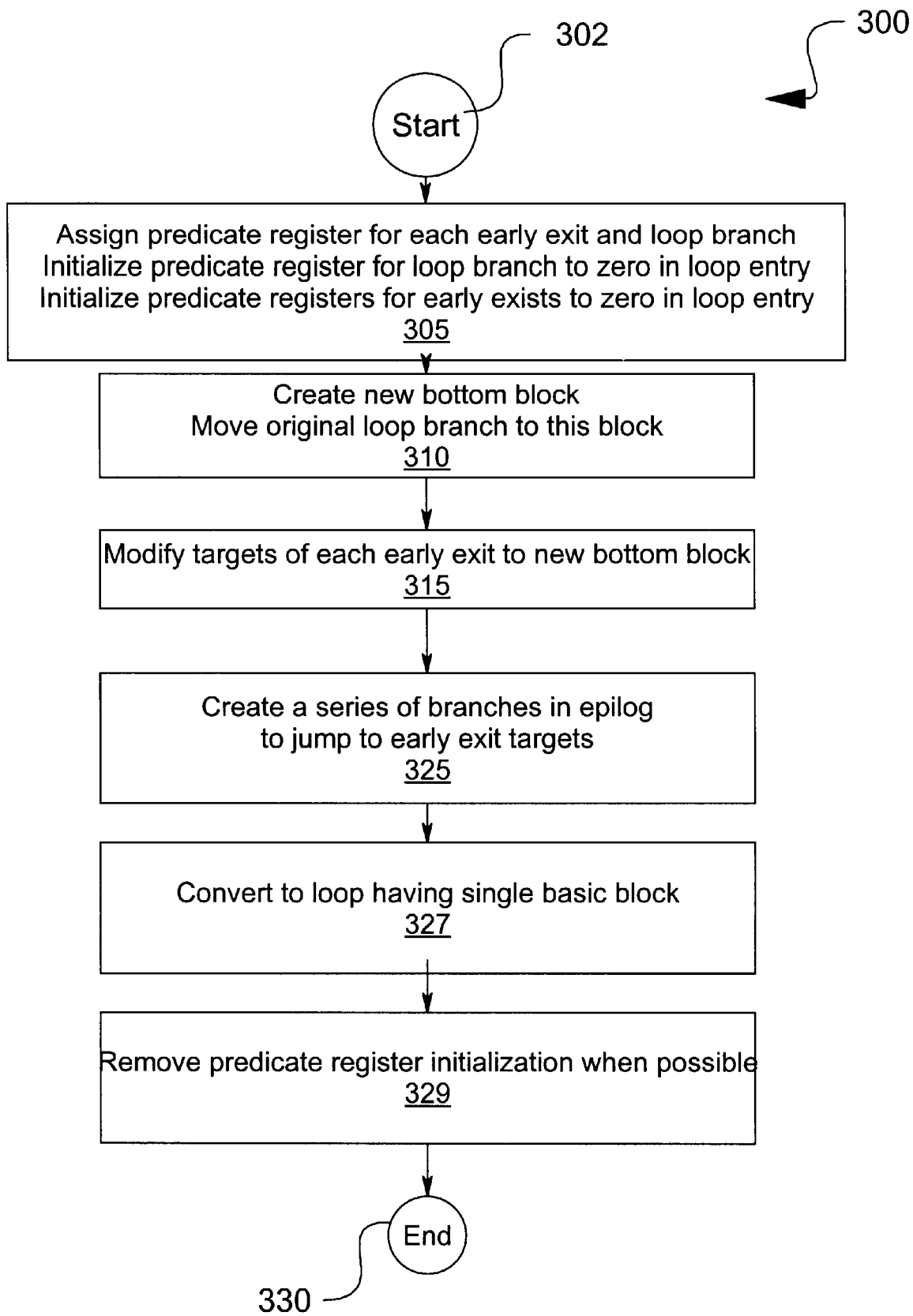
FIG. 6 is a flowchart illustrating an improved technique for transforming loops having early exit conditions.

FIG. 6 is a flowchart 300 illustrating one embodiment of the inventive transformation method for transforming loops having early exit conditions. This inventive technique exploits certain characteristics of predicated instruction sets in order to improve loop transformation. For example, the invention uses predicate registers to record the prevailing exit condition. After the loop terminates, the predicate registers are examined in order to determine which exit condition was satisfied. As will be apparent to one skilled in the art after reading the discussion below, the invention enables an optimizing compiler to more efficiently pipeline the transformed loops.

The inventive transformation method 300 starts in step 302 and proceeds to step 305. In step 305, the inventive transformation method assigns a predicate register to the loop branch and initializes that predicate register to zero. Thus, loop 7 is initially set to terminate at the beginning of each iteration of loop 7. The method similarly assigns and. initializes predicate registers for each early, exit to zero. The primary reason for initializing predicate registers for the early exits is to ensure that such predicate registers do not have garbage values upon exit from the loop.

In step 310, the method creates a new bottom block and moves the loop branch into the new bottom block. In other words; the comparison for the loop branch is left unchanged but the actual jump back to the beginning of loop 7 is moved to this new block. In step 315, the inventive transformation method modifies the target blocks for each early exit such that they jump to the new bottom block. In step 325 the method creates a series of branches in the epilog after the loop. These branches examine the predicate registers for the early exits and jump to the original destinations of the early exits.

In step 327 a compiler converts the transformed loop into a loop having a single basic block using a known technique such as "if-conversion". Finally, in step 329, the compiler removes instructions by replacing the initializations of predicate registers and the corresponding conditional compares with unconditional compares, where possible. For example, conditional compares that dominate the loop exit in the original loop can be optimized this way.

An unconditional compare and conditional compare differ only when the qualifying predicate register is zero. In such cases, the unconditional compare clears both target predicate registers, whereas the conditional compare leaves both target predicate registers unchanged. Using unconditional compares obviates the need for initializing predicate registers for early exits to zero in the loop entry.

Figure 7:
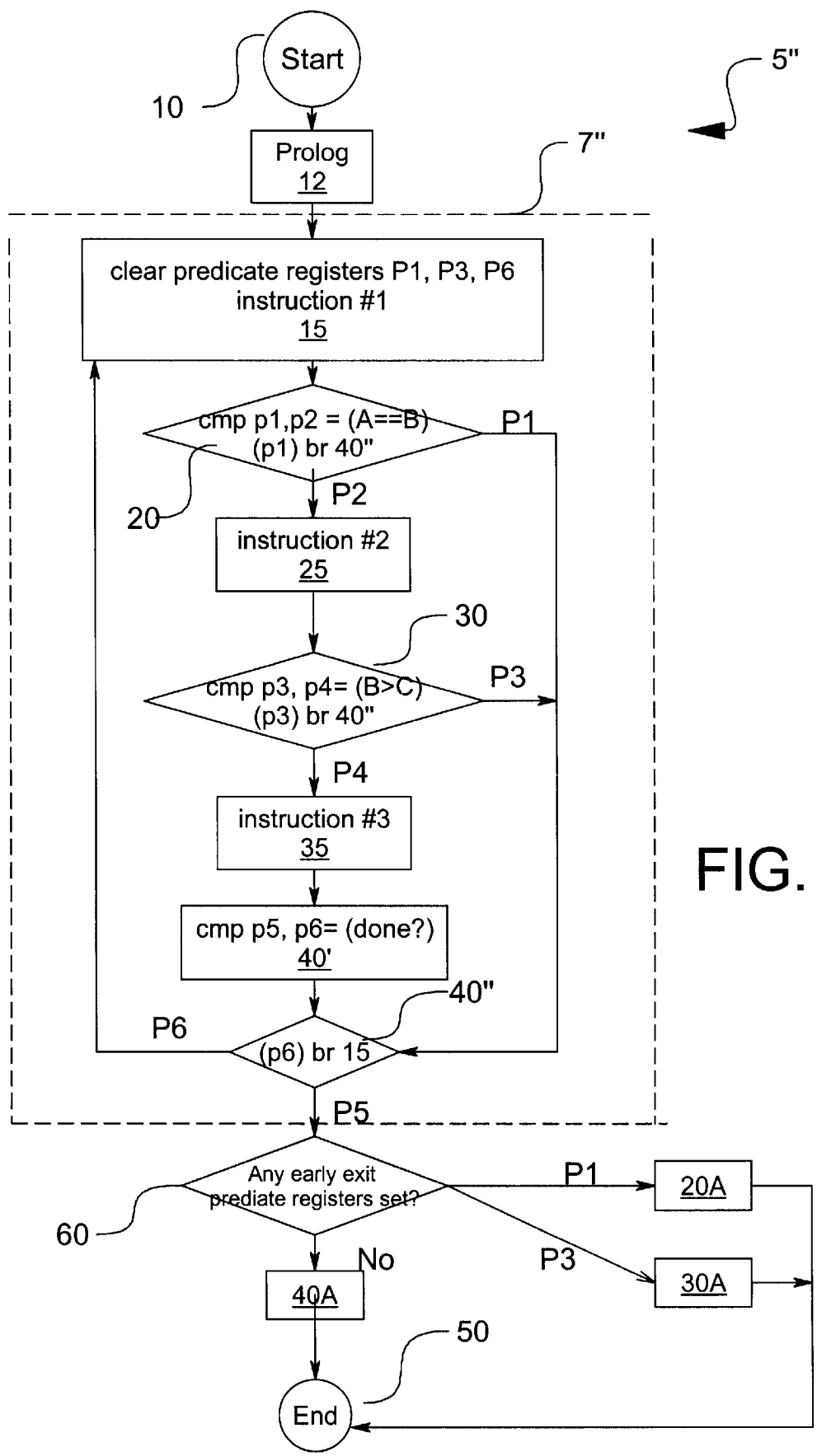
FIG. 7 is a flowchart illustrating the software program of FIG. 3 after transformation according to the improved transformation method of FIG. 6.

FIG. 7 illustrates software program 5 of FIG. 2 after transformation according to the inventive method, thereby resulting in software program 5" having loop 7". According to step 305 of FIG. 6, block. 15has been modified such that the predicate registers used by the loop branch and the early exits are initialized to zero. According to step 310 of the method, a new block 40" is created and the original loop branch is moved from block 40 to the new block 40". The original comparison, however, remains in block 40". According to step 315, the targets for early exits in blocks 20 and 30 have been set to the new block 40". Finally, according to step 325 of FIG. 6, the method adds block 60 that determines whether the predicate registers for the early exits are set and accordingly proceeds to blocks 20A, 30A or 40A.

The following pseudo code is one example of how a compiler could convert the transformed loop 7" of FIG. 7 into a single basic block:

| | |
|---|---|
| C1 | instruction #1 |
| C2 | cmp.unc p1, p2 = (A == B) |
| C3 | (p2) instruction #2 |
| C4 | (p2) cmp.unc p3, p4 = (B > C) |
| C5 | (p4) instruction #3 |
| C6 | (p4) cmp.unc p5, p6 = (DONE?) |
| C7 | (p6) branch line C1 |

In the above pseudo code, line C1 simply executes instruction #1. Note, the compiler has removed the initialization of predicate registers P1, P3 and P6. Line C2 implements the first early exit condition of FIG. 2, i.e., block 20. Line C2 sets P1 to one and P2 to zero when A equals B and sets P2 to one and P1 to zero when A does not equal B. Line C3 is a predicated instruction that executes instruction #2 when P2 is set. Line C4 is also predicated by P2 and implements the second early exit condition of FIG. 2, i.e., block 30. More specifically, if the qualifying predicate register P2 is one, line C4 sets P3 to one and P4 to zero if B is greater than C and sets P4 to one and P3 to zero if B is not greater than C. If P2 is zero, it clears both P3 and P4. Line C6 tests whether the loop is finished and sets P5 and P6 accordingly. Line C7 branches to line C1 (Block 15 of FIG. 2) when P6 is set, i.e., loop 7 is not finished.

The pseudocode resulting from the inventive transformation method has four fewer instructions than the pseudocode resulting from the conventional method. This reduces the resourceII for the loop. In, addition, the minimum recurrence II of this approach is only 3 cycles, resulting from the circular chain of dependences: C6→C2→C4→C6. This is a significant improvement over the 5 cycles of the conventional method.

Various embodiments of the invention have been described that transform software loops having early exit conditions. Several advantages of the invention have been illustrated. For example, the resulting loops have a lower recurrence II and a lower resource II than conventional techniques. The present invention enables an optimizing compiler to more efficiently pipeline the transformed loops. It is intended that only the claims and equivalents thereof limit this invention.

We claim:

1. A computer-implemented method for transforming a software loop having one or more early exits comprising:
   assigning a predicate register for each early exit of a software loop;
   setting the assigned predicate register when the corresponding early exit condition is satisfied; and
   examining the assigned predicate registers when the software loop terminates to determine which early exit conditions are satisfied.

2. The method of claim 1 and further comprising:
   assigning a predicate register for a loop branch that controls whether the software loop is repeated;
   initializing the predicate register controlling the loop branch such that loop branch defaults to exiting the loop; and
   modifying the early exits to jump to the loop branch.

3. The method of claim 1 and further comprising:
   initializing the predicate registers for each early exit condition to ensure that the predicate registers are defined for each loop iteration.

4. The method of claim 2, wherein the predicate registers are initialized for each of the software loop.

5. The method of claim 1 and further including replacing at least one conditional compare that dominates a normal exit of the loop with a corresponding unconditional compare.

6. A software compiler stored on a computer-readable medium for a computer having a predicated instruction set, wherein the compiler when executed by the computer transforms a software loop having one or more early exit conditions by generating computer-executable instructions to perform the method comprising:

assigning a predicate register for each early exit condition of a software loop;

setting the assigned predicate register when the corresponding early exit condition is satisfied; and examining the assigned predicate registers when the software loop terminates to determine which early exit conditions are satisfied.

7. The software compiler of claim 6 further generating computer-executable instructions to perform:

assigning a predicate register for a loop branch that controls whether the software loop is repeated;

initializing the predicate register controlling the loop branch such that the loop branch defaults to exiting the software loop; and modifying early exits to jump to the loop branch.

8. The software compiler of claim 6 further generating computer-executable instructions to initialize the predicate registers assigned for each early exit condition.

9. The software compiler of claim 8, wherein the predicate initialization instructions are executed for each iteration of the software loop.

10. The software compiler of claim 6 further including generating computer-executable instructions to replace at least one conditional compare that dominates a normal exit of the loop with a corresponding unconditional compare.

11. A computer comprising a plurality of predicate registers, wherein one of the predicate registers is allocated for each early exit condition of a software loop executing on the computer, and further wherein each predicate register is set when the corresponding early exit condition is satisfied and is examined when the loop terminates to determine which early exit conditions have been satisfied.

12. The computer of claim 11 further comprising a predicate register allocated for a loop branch that controls whether the software loop is repeated, wherein the predicate register controlling the loop branch is initialized such that the loop branch defaults to exiting the loop.

13. The computer of claim 12, wherein the predicate registers allocated to the early exit conditions are initialized for each iteration of the loop.

14. The computer of claim 13, wherein the predicate register allocated to the loop branch is initialized for each iteration of the loop.

15. A computer-readable medium having computer-executable instructions to cause a computer to transform a software loop by performing the method of:

assigning a predicate register for each early exit condition of a software loop;

setting the assigned predicate register when the corresponding early exit condition is satisfied; and examining the assigned predicate registers when the software loop terminates to determine which early exit conditions have been satisfied.

16. The computer-readable medium of claim 15 further including computer-executable instructions to cause a computer to further perform the method:

assigning a predicate register for a loop branch that controls whether the software loop is repeated;

initializing the predicate register controlling the loop branch such that the loop branch defaults to exiting the software loop; and modifying early exit conditions to jump to the loop branch.

17. The computer-readable medium of claim 16 further including computer-executable instructions to cause a computer to initialize the predicate registers for each iteration of the loop.

18. The computer-readable medium of claim 15 further including computer-executable instructions to replace at least one conditional compare that dominates a normal exit of the loop with a corresponding unconditional compare.

* * * * *

UNITED STATES PATENT AND TRADEMARK OFFICE
CERTIFICATE OF CORRECTION

PATENT NO. : 6,571,385 B1
DATED : May 27, 2003
INVENTOR(S) : Kalyan Muthukumar et al.

It is certified that error appears in the above-identified patent and that said Letters Patent is hereby corrected as shown below:

<u>Title page,</u>
Item [56], References Cited, OTHER PUBLICATIONS, "Compilers, Principles" reference, delete "et al," and insert -- et al., -- therefor.

Signed and Sealed this

Tenth Day of August, 2004

JON W. DUDAS
*Acting Director of the United States Patent and Trademark Office*